United States Patent [19]
Schmidt

[11] 4,103,752
[45] Aug. 1, 1978

[54] FIFTH WHEEL SCALE APPARATUS

[75] Inventor: Kenneth J. Schmidt, Thurston, Oreg.

[73] Assignee: General Trailer Company, Inc., Springfield, Oreg.

[21] Appl. No.: 758,008

[22] Filed: Jan. 10, 1977

[51] Int. Cl.² .............................................. G01G 19/10
[52] U.S. Cl. ..................................... 177/141; 177/254
[58] Field of Search ............... 177/141, 139, 136, 138, 177/208, 209, 146, 254; 73/141 R

[56] References Cited

U.S. PATENT DOCUMENTS

| 2,109,460 | 3/1938 | Brasher | 177/141 X |
| 2,586,137 | 2/1952 | Yoder | 177/141 |
| 2,646,272 | 7/1953 | Swift | 177/141 |

Primary Examiner—Joseph W. Hartary
Attorney, Agent, or Firm—Kolisch, Hartwell, Dickinson & Stuart

[57] ABSTRACT

Weighing apparatus for a fifth wheel assembly, including a rockable subframe adapted for carrying such an assembly constructed for pivotal mounting with respect to an underlying vehicle frame. An inflatable air pad is disposed beneath the subframe, and is operable under inflation to pivot the subframe to a position wherein the pad carries a portion of any load borne by the subframe. Connected to the pad is a calibratable scale system for producing a load indication under such circumstances. Further provided is a safety locking system for releasably locking the subframe against pivoting under conditions of normal vehicle travel.

9 Claims, 7 Drawing Figures

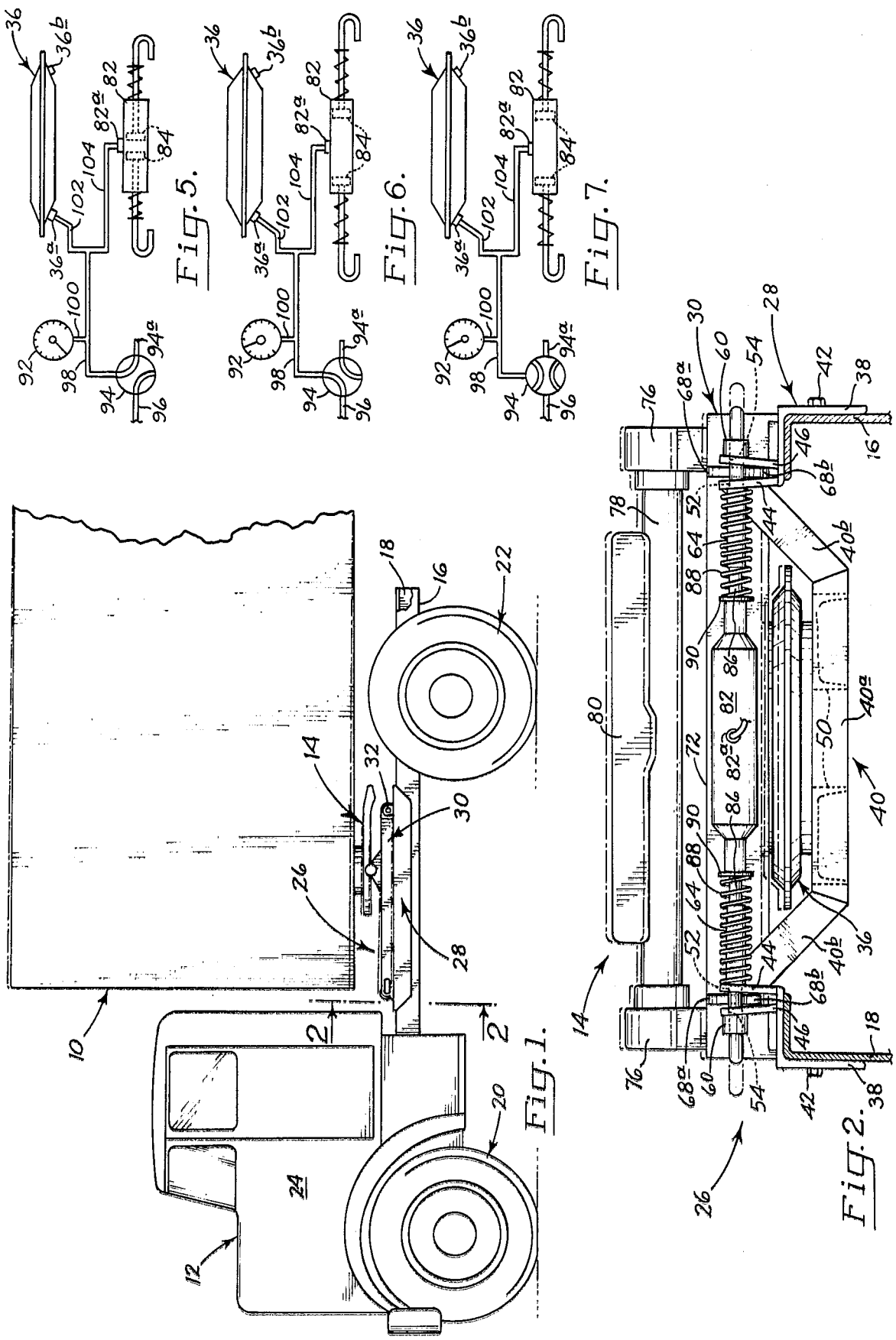

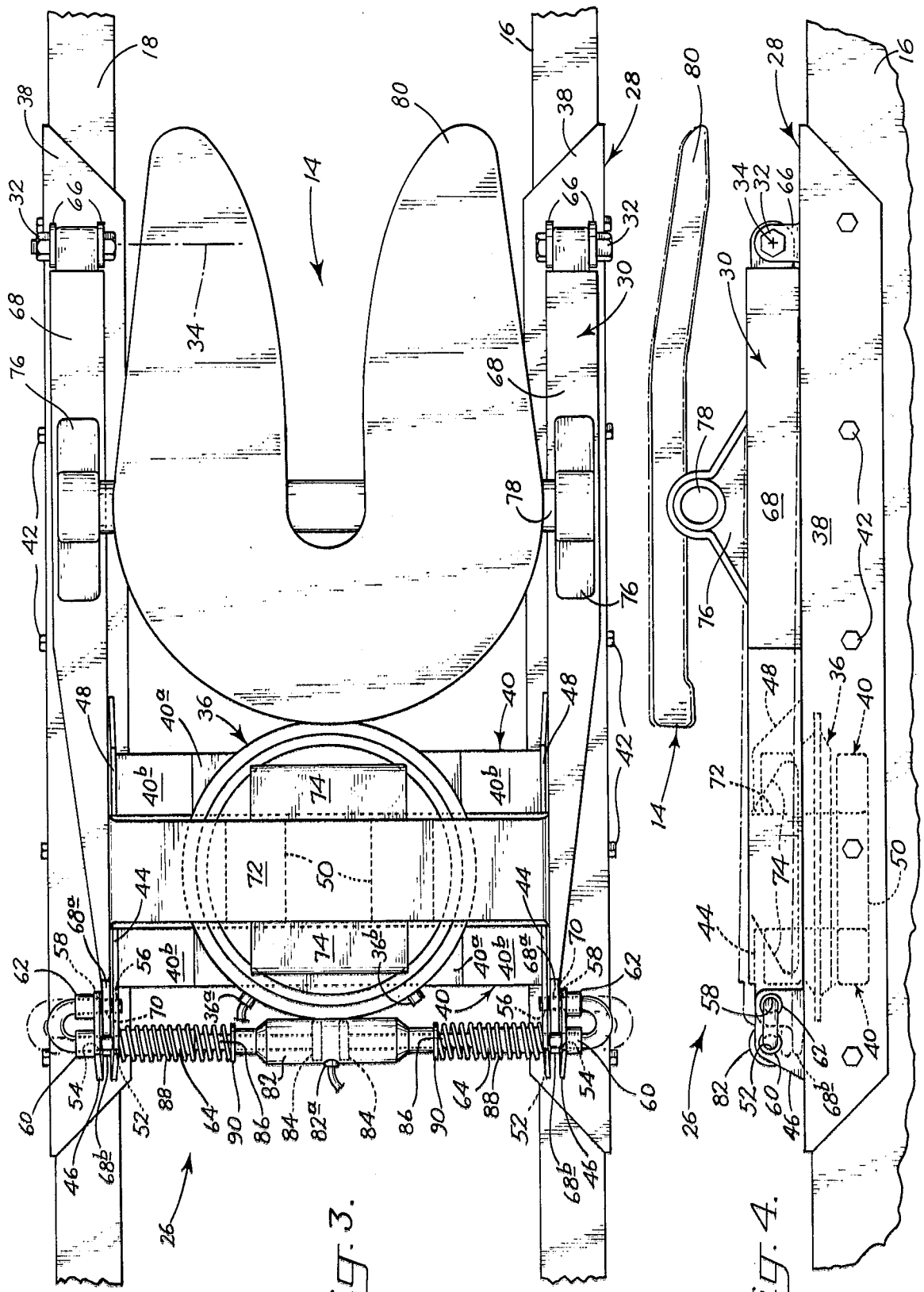

FIFTH WHEEL SCALE APPARATUS

BACKGROUND AND SUMMARY OF THE INVENTION

This invention pertains to weighing apparatus for a fifth wheel assembly.

Fifth wheel assemblies are used in many applications to couple a trailer to a tractor. The assembly, in such an instance, is normally mounted on and adjacent the rear end of the frame in a tractor.

There are a number of instances in which it is desirable to be able to measure the load transmitted into a tractor frame through such an assembly. For example, in vehicles which are used to haul especially heavy loads, it is important that the overall weight of a loaded vehicle be held below certain statutory maximum limits. With these kinds of vehicles, an onboard scale (or weighing) system offers a significant advantage to a vehicle operator, in that he can instantly monitor the loaded condition of his vehicle a loading operation.

A general object of the present invention is to provide a unique, simple, accurate and reliable system for weighing the load transmitted through a fifth wheel assembly provided for coupling a tractor and trailer.

According to a preferred embodiment of the invention the proposed scale apparatus includes a rockable subframe adapted for carrying a conventional fifth wheel assembly, with this subframe constructed for pivotal mounting with respect to an underlying vehicle frame. An inflatable air pad is disposed beneath the subframe, and is operable, under inflation, to pivot and lift the subframe to a position wherein the pad carries a portion of any load borne by the subframe. Connected to the pad is a calibrated air scale system for producing an appropriate load indication. Further provided in the apparatus is a safety lock mechanism for releasably locking the subframe against pivoting under conditions of normal vehicle travel.

When it is desired to weigh the load carried through a fifth wheel assembly, this is normally done with the vehicle stationary. The lock mechanism is operated to release the subframe, and the air pad is inflated to pick up and pivot the subframe, thereby itself beginning to carry a part of the load transmitted into the subframe. Under this circumstance, a load reading may be taken, and of course the scale system will have been precalibrated so as to provide a direct indication of load on the associated fifth wheel assembly.

When weighing is complete, and it is desired to prepare the vehicle for travel, the air pad is deflated to relower the subframe, and the lock mechanism is reactuated to lock the subframe securely in place. As a consequence of this action the fifth wheel assembly carried on the subframe is secured with respect to a tractor's frame, and, during travel, dynamic and static loads are not required to be carried through the air pad.

These and other objects and advantages which are attained by the invention, will become more fully apparent as the description which now follows is read in conjunction with the accompanying drawings.

DESCRIPTION OF THE DRAWINGS

FIG. 1 is a fragmentary side elevation showing a tractor and trailer coupled through a conventional fifth wheel assembly which is supported on weighing apparatus constructed in accordance with the present invention.

FIG. 2 is an enlarged fragmentary front elevation showing details of the weighing apparatus employed with the vehicles of FIG. 1.

FIG. 3 is a fragmentary top plan view, on about the same scale as FIG. 2, of the apparatus of FIG. 2.

FIG. 4 is a side elevation of the proposed weighing apparatus, taken generally from the bottom side of FIG. 3.

FIGS. 5, 6 and 7 are simplified schematic views illustrating a pneumatic system which is used in conjunction with the weighing apparatus of FIGS. 2, 3 and 4, showing the latter in different respective operating conditions.

DETAILED DESCRIPTION OF THE INVENTION

Turning now to the drawings, and referring first to FIG. 1, indicated generally at 10 is a conventional highway trailer coupled, adjacent its front end, for towing by a conventional tractor 12 through the usual fifth wheel assembly shown generally at 14. The rear end of the trailer is supported for travel over the ground through the usual rear wheel assemblies and suspensions (not shown). Tractor 12 includes the usual longitudinal frame, which herein is made up of a pair of opposing, spaced-apart, parallel channel members 16, 18 that extend substantially the full length of the tractor. The front of the tractor frame is supported for travel over the ground through the usual steerable front wheel assemblies, such as that shown at 20, and the rear of the frame is supported through the usual power-driven rear wheel assemblies, such as that shown at 22, that are driven by the usual vehicle engine mounted beneath a conventional cab and hood construction 24.

Tractor 12, as is usually the case with such vehicles, is provided with an onboard pressurized air system which is pressurized in a conventional manner through the operation of the engine in the tractor. The details of such an air system form no part of the present invention, and accordingly, the components in the system are not shown. However, and as will be more fully discussed, portions of the invention described herein make use of this system, and are coupled to it in a manner which will be fully explained later.

As was previously mentioned, under virtually all normal operating circumstances, it is necessary that the respective axle loads in the tractor-trailer combination be held below certain statutory limits. Proposed by the present invention is a weighing apparatus usable in conjunction with a tractor, such as tractor 12, to measure the load transmitted thereto (from a connected trailer) through a fifth wheel assembly. In the combination shown in FIG. 1, such apparatus is illustrated generally at 26 in a condition mounted on the channels of the tractor frame and supporting, as will be described, fifth wheel assembly 14. As will further be described in detail, apparatus 26 may be thought of as having basically two different operating conditions. One of these conditions is that which it occupies during none-weighing circumstances, as, for example, when a vehicle combination is traveling over a highway. The other operating condition is one in which it is "activated", so-to-speak, to monitor, and provide an indication of, the load transmitted into the tractor from the trailer. From knowledge of the relative locations of the front and rear wheel assemblies of the tractor, with respect to the location of the fifth wheel assembly, it is a simple matter for an operator, knowing the load transmitted through the fifth wheel assembly, to determine whether the front and rear axle loads for the tractor are below the requisite limits.

Details of construction of apparatus 26 are shown most clearly in FIGS. 2, 3 and 4, and attention is now directed more particularly to these three figures. Included in apparatus 26, in general terms, are a mounting subframe, or mounting means, 28, a rockable or shiftable subframe 30 disposed above the mounting subframe and having its rear end pivoted through pivot connections 32 to subframe 28 for vertical rocking about a substantially horizontal axis 34, and an air pad 36 which is mounted on subframe 28 and intended to act, as will be described, between subframes 28, 30. Air pad 36 is also referred to herein as an expandible-contractible device, as an inflatable-deflatable device, as a fluid-operable unit, and also as a shifting means.

Considering subframe 28, this includes a pair of substantially parallel laterally spaced angles 38 interconnected, as by welding, adjacent their forward ends, by a pair of spaced-apart, substantially parallel, angularly formed cross members 40. Angles 38 are sized and spaced relative to one another to seat, as shown, on channel members 16, 18 and the angles are secured to the channel members through nut and bolt assemblies, such as those shown at 42. Each of cross members 40 includes a substantially horizontal midsection 40a which joins at an oblique angle with a pair of end sections 40b. This arrangement is most clearly shown in FIG. 2. Each of the three sections in a cross member is formed by a rigid rectangular tube.

Joined as by welding to the top web of each angle 38, adjacent the forward end thereof, are two upwardly extending plates, including an inner plate 44 and an outer plate 46. As can be seen particularly in FIG. 2, these two plates in each pair are slightly spaced apart, and diverge progressing upwardly between the plates. Plates 44 are somewhat longer than plates 46, and as positioned on angles 38, have rear ends which project rearwardly of plates 46. Opposite ends of outer end section 40b in the forwardmost cross member 40 are welded to the inner faces of the rear ends of plates 44. Opposite ends of the end sections in the other cross member are welded to the confronting faces of a pair of plates 48 which are welded on top of angle 38 and spaced rearwardly from plates 44. Plates 48 are substantially coplanar with plates 44. Inverted channels 50 interconnect the confronting faces of midsections 40a in cross members 40. The top faces of channels 50 are substantially coplanar with the top faces of the tubes forming midsections 40a.

Referring to each associated pair of plates 44, 46, provided in these plates are two pairs of axially aligned bores which may be thought of as a forward pair, including bores 52, 54, and a rearward pair, including bores 56, 58. More specifically, bores 52, 54 are axially aligned with one another and are disposed slightly forwardly of bores 56, 58, which are also aligned axially with one another. Each of these two pairs of aligned bores is aligned along an axis which extends substantially horizontally, and at substantially a right angle to the longitudinal axis of the tractor frame, with apparatus 26 mounted in place as shown.

Joined as by welding to the outside faces of outer plates 46 are tubular guide collars 60, 62 which are aligned axially with bores 54, 58, respectively. Joined to the inner faces of plates 44 are tubular guide collars 64, which are aligned axially with bores 52. The function of these associated bores and guide collars will be explained shortly.

Completing a description of subframe 28, mounted on top of each angle 38, adjacent the rear end thereof, are laterally spaced lugs 66 which form part of previously mentioned pivot connections 32.

Rockable subframe 30 includes a pair of substantially parallel elongated box-construction arms 68, the rear ends of which are pivoted to lugs 66 in pivot connections 32. As can be seen particularly in FIG. 3, arms 68, about midway between their opposite ends, are tapered toward their forward ends, and are provided with thin forward projections 68a that are sized and spaced to be received between the two sets of inner and outer confronting plates 44, 46, previously mentioned. Projections 68a are provided with forwardly projecting tongues 68b that function as will shortly be described. As can be seen especially in FIG. 4, forward projections 68a do not extend forwardly past aligned bores 52, 54, but tongues 68b do so project. Projections 68a are provided with bores 70 that are adapted to align with previously mentioned aligned bores 56, 58.

Extending between the forward ends of arms 68, and rigidly joining these arms, is a rectangular tubular substantially horizontal cross member 72.

With subframe 30 pivoted as shown on subframe 28, the former is mounted so as to permit vertical rocking or swinging about axis 34 relative to subframe 28. Cross member 72 is positioned so as to extend substantially centrally over the structure that interconnects angles 38 in subframe 28. This situation is clearly shown in FIGS. 3 and 4.

Joined to the forward and rearward sides of cross member 72, substantially centrally between the opposite ends of this cross member, are two hollow, triangular-section, elongated flange members 74 whose bottom faces are substantially coplanar with the bottom face of cross member 72.

As was previously mentioned, subframe 30 is adapted to carry or support a conventional fifth wheel assembly, like assembly 14. Accordingly, the trunions 76 of assembly 14 are suitably joined on top of arms 68, with shaft 78 in the assembly extending between these trunions at substantially a right angle to the tractor's longitudinal axis. Fifth wheel plate 80 in the assembly, which is mounted for rocking on shaft 78, is disposed substantially centrally between the trunions. The longitudinal position of the fifth wheel assembly is a matter of choice, and is typically positioned whereby it is located, in a fore and aft sense, where it would normally be located directly on a tractor frame in the absence of weighing apparatus 26.

Completing a description of apparatus 26, air pad 36 has what might be thought of as a flat, circular, pancake-like construction, and is of conventional construction. While various particular devices may be used for the air pad, one which has been found to be particularly suitable is a device known as a Lifting Chamber, made by Williams Air Controls Company, Portland, Oregon, and sold as units No. WM-651 and WM-652 (the two differing only with respect to lifting capacity). Air pad 36 is provided with an air inlet 36a (which is connected as will be described to the air pressure system in tractor 12), and what is known as a bleeder exhaust 36b that is vented to the atmosphere. Pad 36 is suitably secured on top of cross members 40 in the position shown. When deflated, the pad is out of contact with any part in subframe 30. This situation is shown in solid outline in the figures. When the pad is inflated, it expands upwardly, engages the undersides of cross member 72 and flange members 74, and picks up subframe 30 -- pivoting or rocking the same about axis 34.

Further describing apparatus 26, indicated at 82 is a transversely extending air cylinder in which are reciprocably mounted a pair of pistons 84 that connect with rods 86 which extend outwardly from the axially opposite ends of cylinder 82. Suitably joined to each of rods 86 is what might be referred to as a somewhat J-shaped cylindrical bar which extends, progressing outwardly from a rod, axially through a collar 64, a bore 52, a bore 54 and a collar 60. The bar then reversely bends on itself, with its outer end extending inwardly axially through a collar 62, and through one or both of a bore 58 and a bore 56 (as will be explained). An air inlet 82a is provided for introducing air in the space between pistons 84, and for exhausting such air, selectively. Surrounding each collar 64 is a biasing spring 88 which acts between a plate 44 and a collar 90 that is secured to a rod 86. Springs 88 tend to urge the pistons and rods toward one another, and more specifically towards relative positions with the outer reversely bent ends of the J-shaped bars extending through aligned bores 56, 58.

Turning now to FIGS. 5, 6 and 7, and completing a description of apparatus 26 along with an operational discussion, also included in the proposed weighing apparatus are an air pressure gauge 92, also referred to as an indicating means and as a scale means, and an air pressure control valve 94 of conventional design. A conduit 96 connects valve 94 with the air pressure system in the tractor. Conduits 98, 100 connect the valve and gauge 92. Conduit 98 also connects through a conduit 102 with inlet 36a of air pad 36, and through a conduit 104 with inlet/exhaust 82a of cylinder 82. An exhaust 94a is provided for valve 94, as shown.

Under normal operating conditions, and when no weighing operation is to take place, the spool in valve 94 occupies the position shown for it in FIG. 5. Under these circumstances, air pressure is cut off from conduit 96, through operation of the tractor's air system, and conduit 98 vents gauge 92, pad 36 and cylinder 82 to the atmosphere through the valve. As a consequence, pad 36 is fully deflated and is out of contact with cross member 72 and flanges 74. Biasing springs 88 hold the pistons 84 in closely adjacent positions within cylinder 82, and the J-shpaed bars are drawn inwardly to lock subframe 30 against any vertical movement relative to subframe 28. This situation appears in solid outline in FIGS. 2 and 3. A zero reading exists in gauge 92.

When it is desired to make a measurement of the load transmitted from the trailer through the fifth wheel assembly, the spool in valve 94 is adjusted to the position shown for it in FIG. 6, and air pressure is turned on in the tractor's air system, whereupon air pressure is supplied to the guage, air pad and cylinder 82. As a consequence, and occuring almost immediately, pistons 84 shift apart to place the J-shaped bars in the positions shown therefor in dashed outline in FIGS. 2 and 3, whereupon the reversely bent ends of these bars no longer extend between plates 44, 46. This action unlocks subframe 30 for limited relative vertical rocking with respect to subframe 28. Air pad 36 expands vertically, and shortly after unlocking of the rockable subframe, as just described, the air pad engages the undersides of cross member 72 and of flanges 74, thus to pick up the forward end of subframe 30. Vertical clearance between tongue 68b and the portions of the J-shaped bars that extend through aligned bores 52, 54 allows limited vertical movement of the forward end of subframe 30. Under normal conditions, tongues 68b do not contact the overlying portions of the J-shaped bars.

This action continues until a pressure is reached in the system, with pad 36 expanded, whereupon the pad, performing in accordance with its conventional design, allows air to escape through bleeder exhaust 36b, thus placing the pad in what might be thought of as an equilibrium condition. Under these circumstances, the pressure read by gauge 94 remains substantially constant, and is interpretable directly as an indication of the load transmitted through fifth wheel assembly 14. Gauge 92 is calibrated herein to provide such a direct indication. Rather than allowing air to continue to bleed through the air pad, and referring to FIG. 7, the spool in valve 94 is adjusted to the position shown therein which blocks the escape of air from the air pad and cylinder 82, and holds the system in a condition monitoring the load.

When it is desired to return the apparatus to the original condition described, the spool in valve 94 is adjusted to the position shown in FIG. 5, with air then exhausting from cylinder 82 and pad 36. As the pad deflates, the pressure in the system remains sufficiently high to allow relowering of the subframe before relocking of the same relative to subframe 28. This results in the parts returning to the positions shown therefor in solid outline in the figures.

There is, thus, provided a weighing system for use in conjunction with a fifth wheel assembly which meets all of the objectives ascribed to it earlier herein. The system is relatively simple, and is easily incorporated in virtually all conventional tractors. Further, the proposed system can be incorporated in a tractor without disturbing the usual vertical position desired for a fifth wheel assembly.

In cases where such is preferred, the proposed system may be equipped to provide shiftable-position (longitudinal) mounting for a fifth wheel assembly. In other words, there are instances in which an operator may wish, under different loading conditions, to shift the fore-and-aft position of a fifth wheel assembly. Subframe 30 is easily modified to accommodate this kind of adjustable mounting. Also, calibration factors may be provided, under such a circumstance, which enable easy interpretation of the readings of the gauge in the system where the fore-and-aft position of the fifth wheel assembly is moved.

It is further contemplated that, while an air-actuated system is preferable for many reasons, another kind of actuation, such as hydraulic fluid actuation, could be used if desired.

Therefore, while a preferred embodiment of the invention has been described herein, it is appreciated that variations and modifications may be made without departing from the spirit of the invention.

What is claimed is:

1. Weighing apparatus adapted for operative interposition between a fifth wheel assembly and a vehicle frame, said apparatus comprising
   a mounting subframe adapted for attachment to a vehicle frame,
   a rockable subframe pivoted on said mounting subframe and adapted for carrying a fifth wheel assembly, an expandible-contractible device mounted on said mounting subframe for engagement and disengagement with said rockable subframe, said device, when disengaged from said rockable subframe, being inflatable to engage the same, thereby to cause rocking of said rockable subframe to a condition wherein at least a portion of any load borne by such a subframe is transmitted through said device, and means operatively connected to said device for producing an indication of the magnitude of any such transmitted load portion.

2. The apparatus of claim 1 which further includes means for selectively releasably locking said rockable subframe against rocking relative to said mounting subframe.

3. The apparatus of claim 1, wherein said expandiblecontractible device comprises a fluid-operable unit which may be charged with and exhausted of fluid to cause expansion and contraction, respectively, of the device.

4. Weighing apparatuus adapted for operative interposition between a fifth wheel assembly and a vehicle frame, said apparatus comprising a shiftable subframe adapted to carry such an assembly, and further adapted for shiftable-position mounting on such a vehicle frame, said subframe, when so mounted on a vehicle frame, having one shifted-to position relative to the frame wherein all force transmitted to it by any supported fifth wheel assembly is transmitted in full through it directly to the vehicle frame, and having another shifted-to position wherein such a force is only partially transmitted through it directly to the vehicle frame, shifting means adapted for operative interposition between said subframe and any vehicle frame mounting the subframe, operable to shift the subframe between the latter's said two shifted-to positions, and constructed, when in a condition placing said subframe in its said other shifted-to position, to transmit from said subframe to the vehicle frame at least a portion of the force transmitted through said subframe from a supported fifth wheel assembly, and scale means operatively connected to said shifting means, operable, with the shifting means placing said subframe in its said other shifted-to position, to produce an indication directly reflective of any force transmitted through said shifting means between said subframe and said vehicle frame.

5. The apparatus of claim 4 which further includes means for releasably locking said shiftable subframe against shifting relative to a vehicle frame.

6. Weighing apparatus for mounting a fifth wheel assembly on the frame in a vehicle comprising mounting means for mounting said apparatus on such a frame, a rockable subframe pivoted on said mounting means for rocking relative to the mounting means about a substantially horizontal axis with the mounting means in place on a vehicle frame, means in said subframe accommodating the mounting thereon of a fifth wheel assembly, releasable locking means operatively interposed between said mounting means and said subframe operable to lock the two together to prevent rocking of said subframe, and further operable to release the two to permit such rocking, inflatable-deflatable means mounted on said mounting means and operatively interposed between the mounting means and said subframe, inflatable, with said subframe unlocked from said mounting means, to produce rocking of the subframe to a rocked-to position, and scale means operatively connected to said inflatabledeflatable means, operable, with the inflatabledeflatable means supporting said subframe in said rocked-to position, to produce an indication directly reflective of any force transmitted through said inflatable-deflatable means between said subframe and said mounting means.

7. Weighing apparatus adapted for operative interposition between a fifth wheel assembly and a vehicle frame, said apparatus comprising a mounting subframe adapted for attachment to a vehicle frame, a rockable subframe pivoted on said mounting subframe and adapted for carrying a fifth wheel assembly, an expandible-contractible device mounted on said mounting subframe and engageable with said rockable subframe, said device being inflatable to cause rocking of said rockable subframe to a condition wherein at least a portion of any load borne by such subframe is transmitted through said device, said device taking the form of a fluid-operable unit which may be charged with and exhausted of fluid to cause expansion and contraction, respectively, of the device, fluid-actuated locking means for selectively releaseably locking said rockable subframe against rocking relative to said mounting subframe, and means operatively interconnecting said expandiblecontractible device and said locking means, whereby charging of said device to expand it is accompanied by actuation of said locking means to release said rockable subframe.

8. Weighing apparatus adapted for operative interposition between a fifth wheel assembly and a vehicle frame, said apparatus comprising a shiftable subframe adapted to carry such an assembly, and further adapted for shiftable-position mounting on such a vehicle frame, said subframe, when so mounted on a vehicle frame, having one shifted-to position relative to the vehicle frame wherein all force transmitted to it by any supported fifth wheel assembly is transmitted in full through it directly to the vehicle frame, and having another shifted-to position wherein such force is only partially transmitted through it directly to the vehicle frame, fluid-actuatable shifting means adapted for operative interposition between said subframe and any vehicle frame mounting the subframe, operable to shift the subframe with between the latter's said twoshifted-to positions, and constructed, when in a condition placing said subframe in its said other shifted-to position, to transmit from said subframe to the vehicle frame at least a portion of the force transmitted through said subframe from a supported fifth wheel assembly, scale means operatively connected to said shifting means, operable, with the shifting means placing said subframe in its said other shifted-to position, to produce an indication directly reflective of any force transmitted through said shifting means between said subframe and said vehicle frame, fluid-actuatable locking means for releaseably locking said shiftable subframe against shifting relative to a vehicle frame, and means operatively interconnecting said shifting and locking means, whereby actuation of said shifting means is accompanied by actuation of said locking means to release said shiftable subframe.

9. Weighing apparatus for mounting a fifth wheel assembly on the frame in a vehicle comprising mounting means for mounting said apparatus on such a frame, a rockable subframe pivoted on said mounting means for rocking relative to the mounting means about a substantially horizontal axis with the mounting means in place on a vehicle frame, means in said subframe accommodating the mounting thereon of a fifth wheel assembly, fluid-actuated releasable locking means operatively interposed between said mounting means and said subframe, operable to lock the two together to prevent rocking of said subframe, and further operable to release the two to permit such rocking, fluid-actuatable inflatable-deflatable means mounted on said mounting means and operatively interposed between the mounting means and said subframe, inflatable, with said subframe unlocked from said mounting means, to produce rocking of the subframe to a rocked-to position, scale means operatively connected to said inflatabledeflatable means, operable, with the inflatable-deflatable means supporting said subframe in said rocked-to position, to produce an indication directly reflective of any force transmitted through said inflatable-deflatable means between said subframe and said mounting means, and means operatively interconnecting said locking means and said inflatable-deflatable means, whereby inflation of said inflatable-deflatable means is accompanied by actuation of said locking means to release said rockable subframe for rocking relative to said mounting means.

* * * * *